No. 627,574. Patented June 27, 1899.
A. J. DAVIS.
PNEUMATIC CUSHION HANDLE BAR.
(Application filed Feb. 28, 1898.)
(No Model.)
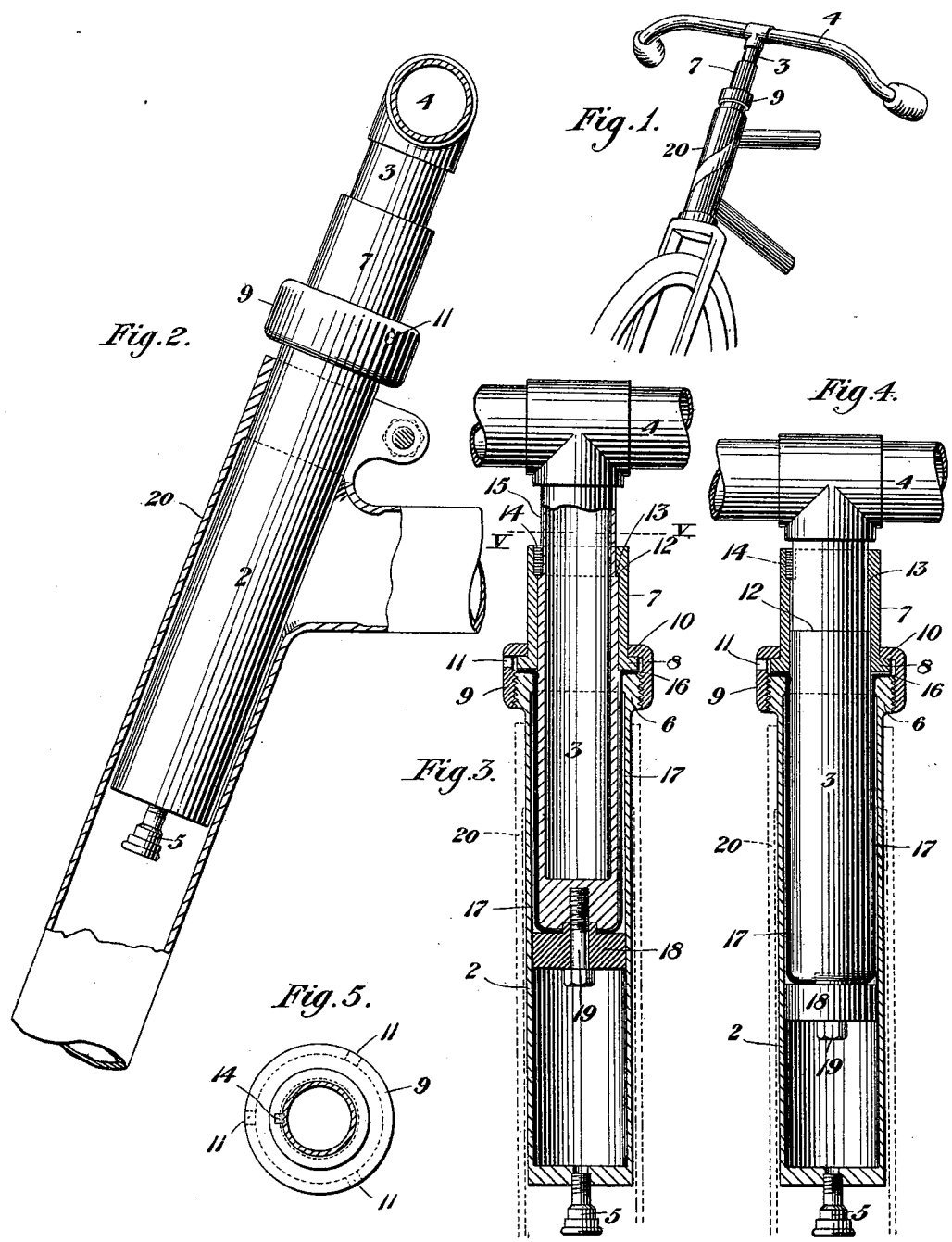
Witnesses:
P. F. Edwards
Watson Large
Inventor
Andrew J. Davis
by O. M. Clarke
his Attorney.
THE NORRIS PETERS CO., PHOTO-LITHO., WASHINGTON, D. C.

UNITED STATES PATENT OFFICE.

ANDREW J. DAVIS, OF CHICAGO, ILLINOIS.

PNEUMATIC-CUSHION HANDLE-BAR.

SPECIFICATION forming part of Letters Patent No. 627,574, dated June 27, 1899.

Application filed February 28, 1898. Serial No. 672,090. (No model.)

*To all whom it may concern:*

Be it known that I, ANDREW J. DAVIS, a citizen of the United States, residing at Chicago, in the county of Cook and State of Illinois, have invented or discovered a new and useful Improvement in Pneumatic-Cushion Handle-Bars, of which the following is a full, clear, and exact description, reference being had to the accompanying drawings, forming part of this specification, in which—

Figure 1 is a perspective view of part of a bicycle, showing my improved pneumatic-cushion handle-bar post in position. Fig. 2 is a side elevation, on an enlarged scale, the head of the bicycle being shown in section. Fig. 3 is a central vertical section through the post. Fig. 4 is a similar view showing the plunger-stem depressed. Fig. 5 is a cross-sectional view on the line V V of Fig. 2.

My invention relates to pneumatic-cushion supports for handle-bars and is designed for the purpose of absorbing shock and vibration, thereby relieving the rider from the strain and injurious effects of vibration due to riding over rough roads.

It is a well-known fact that in the use of bicycles, particularly when riding at high speed, a considerable portion of the weight of the rider is supported by the hands resting on and grasping the bars of the machine and that when the bars are rigidly connected to the head the shocks transmitted to the frame through the wheels are reproduced in the bars and are a source of considerable discomfort and annoyance. My invention is designed for the purpose of eliminating such vibration, thereby contributing largely to the pleasure and safety of riding.

It consists of a plunger-stem forming the handle-bar post, a cylindrical shell constituting an air-reservoir within which the stem is mounted, and means whereby a body of compressed air is utilized as a cushion, with means for connecting the parts and rendering the device air-tight, as I shall now proceed to describe.

Referring to the drawings, 2 is the main cylindrical shell, within which is mounted the hollow plunger-stem 3, designed to have therein a limited longitudinal movement under pressure of the bars 4, rigidly secured to the top of the plunger-stem 3. It is designed that the downward pressure of the stem shall be counteracted by the resistance of a body of compressed air or other fluid contained in the shell 2, and for the purpose of affording means for charging the shell a check-valve 5 is provided at the base. At the top the shell is reinforced, as at 6, and provided with an external screw-thread, and an extension 7 of the shell, provided with a flange 8 at the base, is secured upon the reinforced top of the shell by a threaded coupling 9, having an inwardly-turned flange 10, engaging flange 8 and preferably provided with spanner-holes 11, by which it is screwed into position. The stem 3 fits neatly within the extension 7, which serves as a guide, and near the top of the extension 7 the stem is reduced somewhat in diameter, thereby forming a shoulder 12, which abuts against a corresponding internal shoulder 13 in the shell and limits the upward travel of the shell. A key 14, set in the shell and adapted to engage a keywey 15 in the reduced upper portion of the stem 3, keeps the stem 3 and handle-bars in alinement.

Between the reinforced top 6 of the shell and the flange 8 of the extension is secured the upper circular edge 16 of a cup-shaped diaphragm 17, of elastic material, which surrounds the lower end of plunger 3 and to the end of which it is more tightly secured by a piston-head 18, held on by bolt 19, screwed into the end of the shell, which is purposely reinforced. This piston-head makes a neat sliding fit within the shell 2 and extends slightly beyond the diameter of the diaphragm, thus relieving it from wear and permitting of its free expansion and contraction when in action without danger of rubbing contact. The piston 18 thereby acts as a guide for the stem 3, and the diaphragm insures against leakage or escape of the air.

The shell and the contained parts are designed to be inserted in the hollow head 20 of a bicycle in the usual manner employed with the ordinary bar and tightly clamped therein by any suitable means. In this manner the normal position of the bars may be set to suit the rider, and by varying the internal air-pressure the resistance may be made of any desired degree.

The advantages of my invention will be appreciated by those accustomed to the use of bicycles and will be found to contribute largely to the pleasure of riding.

The construction is very simple, and the device is composed of but few parts, inexpensive, and not liable to get out of order. It may be applied to any make of machine using a hollow head and is easily and readily applied or adjusted by one unfamiliar with mechanics.

Having described my invention, what I claim is—

1. A pneumatic-cushion handle-bar comprising a shell of uniform diameter adapted to be inserted in a bicycle-head, an upward extension thereof secured thereon by a coupling connection and provided with an internal shoulder, a handle-bar plunger-stem mounted in the shell provided with a reduced neck forming a corresponding abutting shoulder, a key engaging a recess in the shell extension and plunger-stem respectively, a cylindrical-shaped diaphragm of elastic material confined at its edges between the shell and its extension and inclosing the plunger, and an air-inlet valve at the lower end of the shell, substantially as set forth.

2. A pneumatic-cushion handle-bar comprising a shell of uniform diameter adapted to be inserted in a bicycle-head, an upward extension thereof secured thereon by a coupling connection and provided with an internal shoulder, a handle-bar plunger-stem mounted in the shell provided with a reduced neck forming a corresponding abutting shoulder, a key engaging a recess in the shell extension and plunger-stem respectively, a cylindrical-shaped diaphragm of elastic material confined at its edges between the shell and its extension and inclosing the plunger, and an air-inlet valve at the lower end of the shell, and a guiding-piston secured upon the end of the plunger-stem and adapted to bind the diaphragm against the end thereof, substantially as set forth.

In testimony whereof I have hereunto set my hand.

ANDREW J. DAVIS.

Witnesses:
PETER J. EDWARDS,
C. M. CLARKE.